United States Patent [19]

Brouwers

[11] Patent Number: 5,073,177
[45] Date of Patent: * Dec. 17, 1991

[54] ROTATIONAL PARTICLE SEPARATOR

[75] Inventor: Jozef J. H. Brouwers, Enschede, Netherlands

[73] Assignee: B.B. Romico B.V. i.o., Astricht, Netherlands

[*] Notice: The portion of the term of this patent subsequent to Feb. 19, 2008 has been disclaimed.

[21] Appl. No.: 598,853

[22] Filed: Oct. 15, 1990

Related U.S. Application Data

[63] Continuation of Ser. No. 414,749, Sep. 27, 1989, Pat. No. 4,994,097, which is a continuation of Ser. No. 173,627, Mar. 25, 1988, abandoned.

[30] Foreign Application Priority Data

Mar. 25, 1987 [NL] Netherlands .......................... 8700698

[51] Int. Cl.⁵ .............................................. B01D 50/00
[52] U.S. Cl. ........................................ 55/317; 55/407; 55/408; 494/76
[58] Field of Search ................... 55/317, 404, 406–409; 494/76

[56] References Cited

U.S. PATENT DOCUMENTS

| | | | |
|---|---|---|---|
| 2,197,120 | 4/1940 | Bergmann | 183/77 |
| 2,944,632 | 7/1960 | Whitmore | 183/77 |
| 3,695,509 | 10/1972 | Javet | 233/30 |
| 3,875,061 | 4/1975 | Palma | 210/223 |
| 4,231,771 | 11/1980 | Winsche | 55/408 |
| 4,468,234 | 8/1984 | McNicholas | 55/1 |

FOREIGN PATENT DOCUMENTS

| | | |
|---|---|---|
| 473574 | 5/1951 | Canada . |
| 821594 | 10/1951 | Fed. Rep. of Germany . |
| 899143 | 12/1953 | Fed. Rep. of Germany . |
| 245979 | 9/1947 | Switzerland . |

*Primary Examiner*—Bernard Nozick
*Attorney, Agent, or Firm*—Webb, Burden, Ziesenheim & Webb

[57] ABSTRACT

A rotational separator for separating particulate material from gas includes a housing having a gas inlet and a gas outlet. A centrifuge is rotatably mounted in the housing along a rotation axis extending through the housing. The centrifuge includes a plurality a radially-spaced individual separation channels which extend parallel to each other and parallel to the rotaton axis. The separation channels extend azimuthally about the rotation axis by less than 360° to prevent azimuthal flows greater than 360° about the rotation axis in any of the individual separation channels.

9 Claims, 3 Drawing Sheets

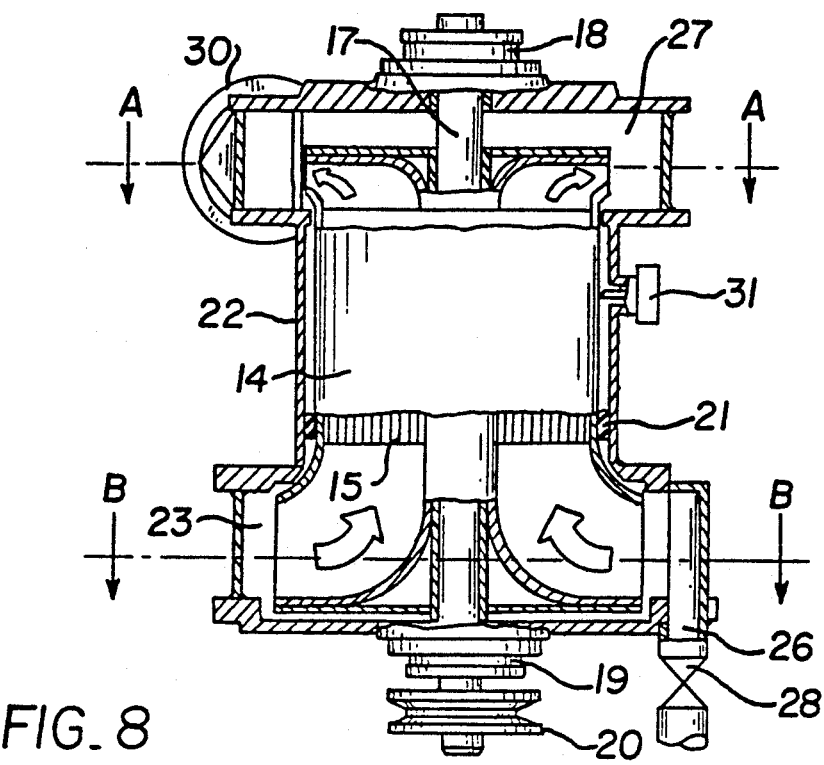
FIG. 8
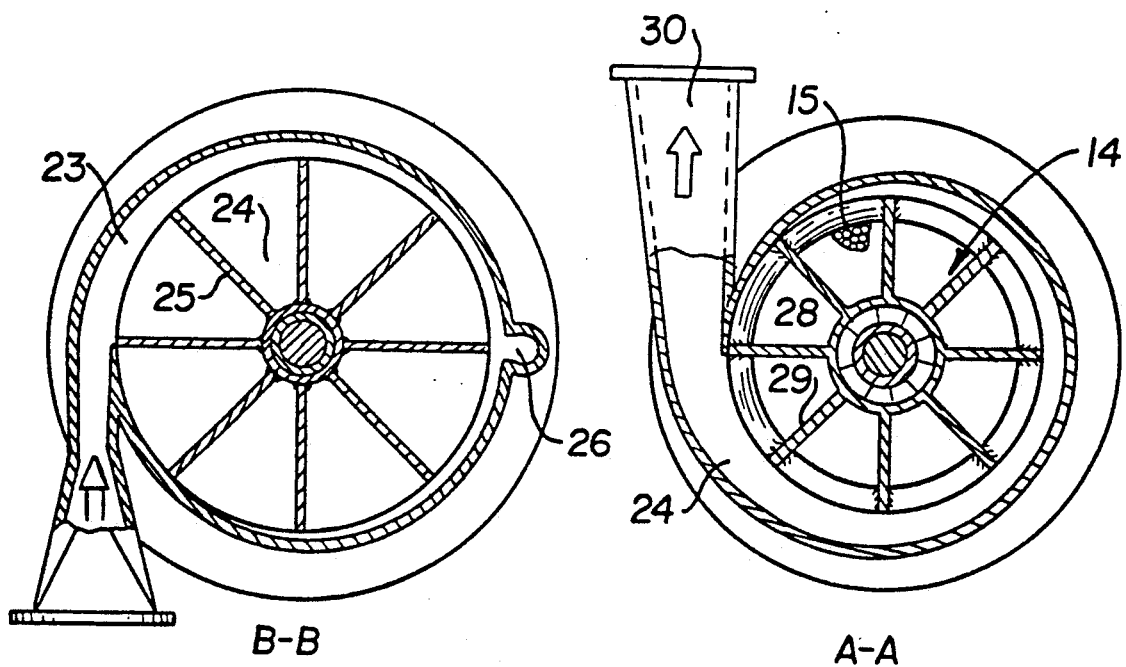
FIG. 9
FIG. 10

ROTATIONAL PARTICLE SEPARATOR

CROSS REFERENCE TO RELATED APPLICATIONS

The present application is a continuation of application Ser. No. 07/414,749 now U.S. Pat. No. 4,994,097, filed Sept. 27, 1989, which is a continuation of application Ser. No. 07/173,627, filed Mar. 25, 1988, now abandoned.

BACKGROUND AND SUMMARY OF THE INVENTION

The present invention concerns a rotating device which is capable of separating small solid or fluid particles having a cross-sectional dimension of about 5 to about 0.1 μm, from gases.

Due to the action of centrifugal force, particulate material dispensed in a gas which is brought into rotation when passed through a separation channel of a centrifugal separator, moves radially away from the axis of rotation towards a radial boundary which extends parallel to the axis of rotation and which forms the outer boundary of the separation channel in the centrifugal separator. The outer boundary of the separation channel serves as a means for collecting those particles which are able to reach and settle at this boundary and which can subsequently be removed from the gas flowing parallel along the collecting boundary.

The resultant velocity with which particles move radially can be assessed from a balance of the centrifugal force acting on the particles and the opposing drag force executed by the gas on the particle as a result of relative motion between the particles and the gas. The extent to which particles can reach the collecting boundary can be assessed from the time required for a particle to reach the collecting boundary in combination with the residence time, i.e., the time for the gas to pass through the separation channel.

Employing centrifugal accelerations of the order of a thousand times the earth gravitational acceleration, one may calculate that particles dispensed in air and having a diameter of about 5 μm and specific mass of about 2000 kilograms per cubic meter will move radially with a velocity of the order of about 1 meter per second. Assuming an axial velocity of the carrier gas of 5 meters per second, all such particles are able to reach the outer boundary when the axial length of the separation channel is of the order of five times the radial width of the separation channel. This corresponds to the dimensions of separation channels of commonly proposed centrifugal separators (U.S. Application No. 4,231,771).

However, in order to separate particles in the micron and submicron range, a number of special requirements must be be met; requirements which are not satisfied by previously proposed centrifugal separators. To make this apparent, it is noted that centrifugally induced radial velocities decrease considerably with diameter of the particles. For particles with diameters of 1 and 0.1 μm, respectively, and other conditions equal to those indicated above, one may calculate centrifugally induced radial migration velocities as small as 0.05 and 0.0005 m/s, respectively. Maintaining an axial velocity of the carrier gas of 5 meters per second, such particles are able to reach the outer boundary when the axial extent of the separation channel is as a large as hundred times and ten thousand times the radial width of the channel, respectively.

The ratio of axial length to radial width which is necessary to collect micron-sized and submicron-sized particles can be reduced by increasing the centrifugal acceleration and decreasing the gas velocity, but the change in these parameters is limited because of increased pressure loss over the separator and reduced throughput per unit area. Centrifugal separators aimed at economically separating micron-sized and submicron-sized particles from gases involve radial migration velocities which are considerably less than the axial throughput velocity, and axially extending separation channels which are considerably longer than their radial width.

As centrifugally induced radial velocities of micron-sized and submicron-sized particles are very small, small perturbations in the flow of the carrier gas may disturb the process of migration of such particles towards the outer boundary and prevent such particles from settling down at this boundary. A flow situation necessary for separating micron-sized and submicron-sized particles is obtained when the gas passes through the separation channel in a laminar flow. Laminar flow is generally achieved when the Reynolds number of the flow through the channel is smaller than 2400, preferably smaller than 2300. The Reynolds number is given by $$Re = \frac{w_o \, d_H}{v},$$

where $w_o$ is the average axial velocity of the gas flow through the channel, v is the kinematic viscosity of the carrier gas and $d_H$ is the hydraulic diameter of the channel. The hydraulic diameter follows from the equation $$d_H = 4 \, A/S,$$

where A is the cross-sectional area through which the gas flows and S the length of the curve enclosing the cross-section. For a circular pipe, $d_H$ is equal to the diameter. For a channel formed by narrowly spaced annular plates, $d_H$ is equal to twice the distance between the plates.

A typical value for the kinematic viscosity of gases is that of air which is approximately equal to $1.8 \times 10^{-5}$ meter squared per second. Assuming an average axial velocity of 5 meters per second, a state of laminar flow can be obtained by employing a hydraulic diameter of less than 8 millimeters. In the case of a separation channel consisting of a circular pipe, this would require the diameter of the pipe to be less than 8 millimeters. In the case of a separation channel which is constituted of annular walls, under the quoted conditions the distance between the walls should be less than 4 millimeters.

Generally, if the Reynolds number is larger than 2400, the flow is no longer stable due to perturbations. Experiments have shown that secondary flows develop which can involve radial fluctuating velocities as large as one tenth of the axial throughput velocity and which are detrimental to the process of migration and settling of micron-sized and submicron-sized particles. Centrifugal separators aimed at collecting particles in the micron and submicron range require separation channels of small radial width such that laminar flow exists.

Another factor causing secondary flow which can affect the separation process is rotation of the gas which is different from that of the surrounding boundaries of the separation channel. Differential rotation can be reduced by applying separation channels whose cross-sections are bounded by single curves. In the case of annular cylinders, this involves adding at least one azimuthal partition wall within the annulus, thus preventing the flow from making an entire swirl around the axis of symmetry of the device. The small radial width of separation channels having singly-connected cross sections, which is pertinent to laminar flow, ensure that differential rotations of the gas at the entrance of the separation channel are small and that these differential rotations decay smoothly with distance from the entrance and do not affect the migration and settling of small particles.

As the cross-sectional dimension of a laminar flow channel is small, the amount of gas which can be stripped from particles in such a channel is limited. Combining a large number of channels in one rotating unit provides a means for handling large amounts of gas to be cleaned. The channels can be dimensioned such that the previously identified conditions for separating small particles are satisfied. The large number of axially-extending separation channels allows large amounts of throughput. Furthermore the separator of the invention is limited in size and is simple in design.

In the present invention account has been taken of the afore stated conditions necessary for separating small solid or fluid particles having a cross-sectional dimension of 5 micron to 0.1 $\mu$m from gases using centrifugation. The invention relates to a rotational separator for separating particulate material from gas, comprising: a housing having a gas inlet, a gas outlet, and an outlet for separated particulate material; a centrifuge mounted for rotation in the housing and comprising separation channels which extend parallel to a common rotation axis; and means for rotating the centrifuge, characterized in that the particulate material separated has a cross-sectional dimension from about 0.1 to about 5 $\mu$m, that the separation channels are provided with singly connected cross sections over a substantial part of the axial separation channel length, and that the hydraulic diameter of the separation channels and the average axial gas velocity are selected in mutual dependence such that the Reynolds number is less than 2400 and the gas passes through the separation channels in a laminar flow. Preferably the Reynolds number is less than 2300.

In a first practical embodiment of the separator of the invention, the separation channels consist of at least one hundred, preferably one thousand and more circular pipes, or channels with non-circular cross-section, extending axially and arranged parallel to the rotation axis.

In a second practical embodiment of the separator of the invention the centrifuge comprises a massive cylinder perforated by at least hundred, preferably one thousand and more axially-extending channels arranged parallel to the rotation axis.

In a third practical embodiment of the separator of the invention the centrifuge comprises at least ten, preferably 30 and more narrowly spaced concentric cylinders and each annulus between two adjacent cylinders is divided by at least one azimuthally placed axially extending partition.

Solid particles which settle at the outer collecting boundary of a separation channel are subjected to shear forces executed by the gas, such forces increasing with decreasing width of the channel through which the gas flows. Due to continuous application of the centrifugal force, however, particles are subjected to wall friction which is larger than the gas friction, thus preventing re-entrainment of particles in the gas flow. Separated particles can be removed by stopping the rotation of the channels, placing these vertically and employing the action of gravity or washing. In case of coagulation to the walls release of particles from the wall can be enhanced by mechanical or acoustic vibration.

In the case of fluid particles or droplets, a fluid film develops at the collecting boundary of the separation channel. If the rotating device is installed with its axis of rotation vertically, collected fluid flows downwards as a result of gravity, and due to the centrifugal force, is propelled outwards when leaving the separation channel. In the housing means can be employed for continuous transportation of the separated fluid.

Fluid which is propelled outwards when leaving any separation channel may enter separation channels which are located at larger radii, this being due to the axial component of the drag force executed on the particles by the gas, assuming that the gas enters the separation channel at the same end as where the collected fluid leaves it. To counteract such re-entrainment, one may extend the length of any separation channel such that its fluid exit and gas inlet extends beyond that of separation channels at larger radii.

Application of collecting walls which are placed nonparallel to the axis of rotation results in a component of the centrifugal force which acts parallel to the collecting boundary and can serve as a means for or to enhance the continuous transportation of collected particles along the wall. In the present invention application of such inclined walls is limited as these walls cause secondary flows, in particular under laminar flow conditions, such secondary flows being due to Coriolis forces and being able to disturb the process of radial migration and settling of micron-sized and submicron-sized particles. Expressed in radians, angles of inclination are limited to values which are of the same order of magnitude as the ratio of the radial width of the separation channel to its axial length.

Collection and transportation of solid particles can be enhanced by spraying a fluid or mist upstream of the separation channels. Particles can then be transported via the fluid film which develops at the collecting boundaries.

To bring the gas in rotation and to minimise pressure losses over the device, rotary means can be installed upstream and downstream of the separation channels. The rotary means can consist of volutes, stator blades, impellers, and/or mechanical drive.

Stator and rotor blades installed upstream and downstream of the separation channels can also serve as a means to control the division of the throughput over the various separation channels and to prevent internal circulations through the device whereby flows in opposite directions occur in separate channels. Control of the throughput over the separate channels can also occur by increasing the flow resistance over part of the separation channels using reduced cross-section, preferably at the downstream end of the separation channels.

Rotation of the gas upstream of the separation channels can be employed to separate larger particles prior to entrance in the separation channels. In this way, the amount and loading per unit time of the separation channels can be limited to those particles for which the channels are designed. In case of batchwise operation, this enables the time of operation until removal of collected particles to be increased.

The above brief description, as well as other objects, features and advantages of the present invention will be more fully appreciated by reference to the following detailed description of presently preferred, but nonetheless illustrative embodiments, when taken in conjunction with the accompanying drawings,

BRIEF DESCRIPTION OF THE DRAWINGS

FIG. 8 is a sectional view of the rotating particle separator according to the present invention, extended with inlet and outlet arrangements.

FIGS. 9-10 are sectional views of the inlet and outlet arrangement of the construction of FIG. 7.

DETAILED DESCRIPTION OF THE PREFERRED EMBODIMENTS

Figure 1:
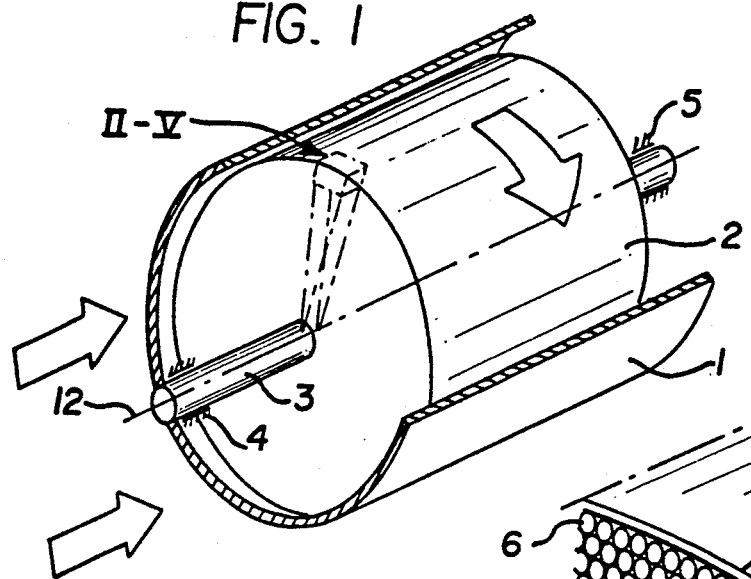
FIG. 1 is a strongly simplified perspective view of the rotating particle separator according to the present invention.

The strongly simplified perspective view of the rotating particle separator (3,000 revolutions per minute) according to the present invention shown in FIG. 1 comprises a cylindrical housing 1 in which a centrifuge 2 is mounted on a shaft 3 supported by bearings 4 and 5. The centrifuge consists of a large number of axially-extending separation channels, arranged in parallel to the rotation axis, these separation channels having singly connected cross-sections and being dimensioned such that laminar flow exists. Enlarged perspective views of four examples of configurations of the separation channels are shown in FIGS. 2-5.

Figure 2:
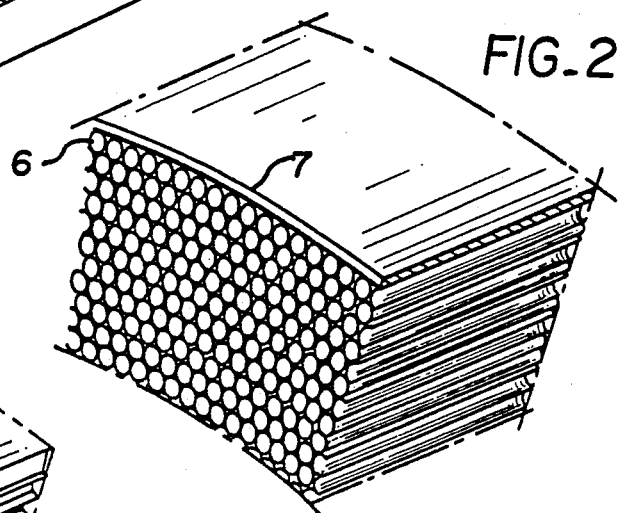
FIGS. 2-5 are enlarged perspective views of four examples of configurations of separation channels according to the present invention which can be employed in the construction of FIG. 1.

The configuration of separation channels shown in FIG. 2 consists of a large number (2,000) of cylindrical pipes 6 (length 0.5-2 m, diameter 1-5 mm) which can be fixed together and which can be contained in a co-rotating cylindrical duct 7.

Figure 3:
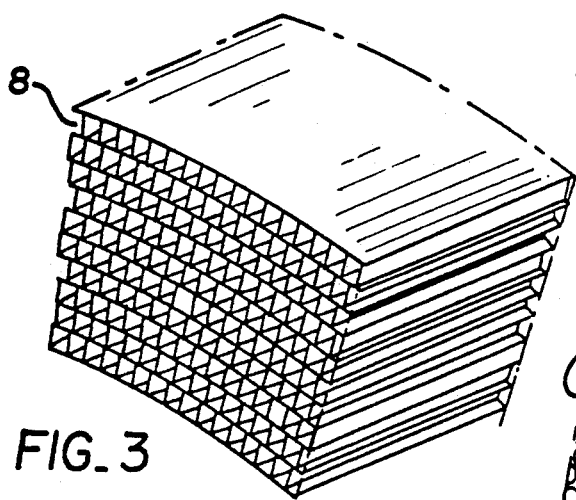

The configuration of separation channels shown in FIG. 3 involves a structure of almost rectangular channels 8. This configuration could be manufactured by enrolling plate with square-shaped profile around a shaft.

Figure 4:
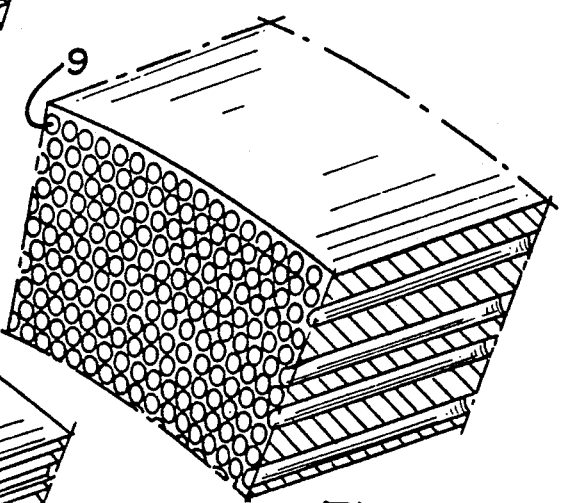

The configuration of separation channels shown in FIG. 4 comprises a cylinder which is axially perforated by a large number of channels 9. This configuration could be manufactured by applying methods of extrusion, molding, injection-molding, or melting.

Figure 5:
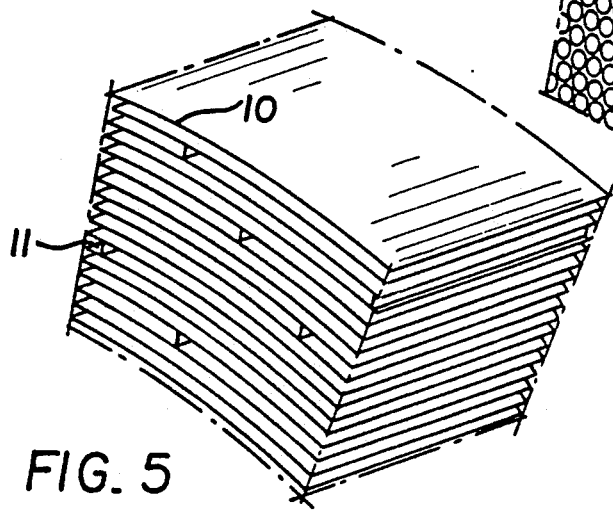

The configuration of separation channels shown in FIG. 5 consists of narrowly-spaced annular plates 10, wherein each annulus is divided by at least one azimuthally placed, axially-extending boundary 11.

Gas with particles entrained therein is brought into rotation when flowing through the separation channels 6, 8, 9 or 10, these separation channels rotating as a rigid body around their joint axis of symmetry 12. Due to the centrifugal force, entrained particles move radially away from the symmetry axis, and towards the radial outer boundary of the separation channel. Particles settle at the outer wall while the gas stripped from these particles leaves the separation channel.

Solid particles which settle at the outer collecting boundary of a separation channel are subjected to shear forces executed by the gas, such forces increasing with decreasing width of the channel through which the gas flows. Due to continuous application of centrifugal force, however, particles are subjected to wall friction which is larger than the gas friction, thus preventing re-entrainment of particles in the gas flow. Separated particles can be removed by stopping the rotation of the channels, placing these vertically and employing the action of gravity or washing. In case of coagulation to the walls, release of particles from the wall can be enhanced by mechanical or acoustic vibration or other mechanical forces.

In the case of fluid particles or droplets, a fluid film develops at the collecting boundary of the separation channels. If the rotating device is installed with its axis of rotation vertically, collected fluid flows downwards as a result of gravity, and due to centrifugal force, is propelled outwards when leaving the separation channel. In the housing means can be employed for continuous transportation of the separated fluid.

It can be seen in FIGS. 2-5 that the separation channels extend azimuthally about the rotation axis by less than 360° to prevent azimuthal flows greater than 360° about the rotation axis in any individual separation channel. Moreover, the separation channels are enclosed along substantially the entire length by a single wall or by boundary walls bounding the separation in radial and azimuthal directions relative to the rotation axis. The separation channels have a cross-section along substantially the entire length which extends azimuthally about the rotation axis by less than 360° to prevent azimuthal flows greater than 360° about the rotation axis.

Figure 6:
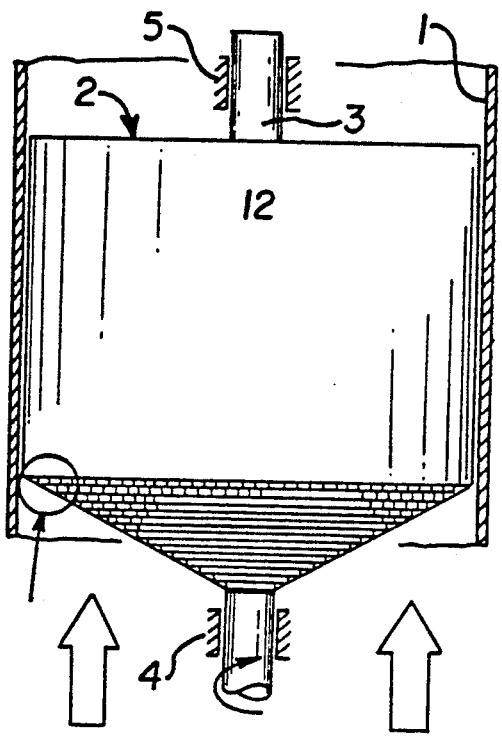
FIGS. 6-7 are sectional views of a variation of the configurations shown in FIGS. 1-5.
Figure 7:
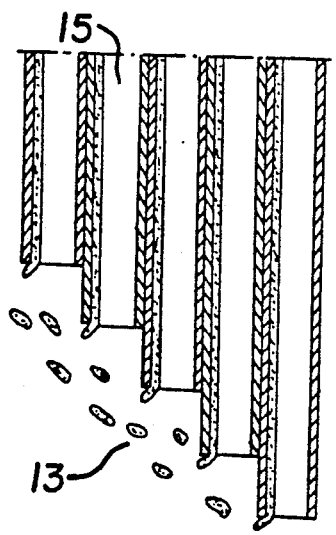

FIGS. 6 and 7 are sectional views of a variation of the configurations shown in FIGS. 1-5. Fluid 13 which is propelled outwards when leaving any separation channel may enter separation channels which are located at larger radii, this being due to the axial component of the drag force executed on the fluid by the gas, assuming that the gas enters the separation channel at the same end as where the collected fluid leaves it. As indicated in FIG. 7, to counteract such re-entrainment, one may extend the length of any separation channel such that its fluid exit and gas inlet end extends beyond that of separation channels at larger radii.

Collection and transportations of solid particles can be enhanced by spraying a fluid or mist upstream of the separation channels. Particles can then be transported via the fluid film which develops at the collecting boundaries.

FIG. 8 is a sectional view of the rotating particle separator according to the present invention extended with inlet and outlet arrangements. The rotating particle separator consists of centrifuge 14 which contains a large number of axially extending singly-connected separation channels 15, arranged in parallel to the rotation axis 16. Examples of configurations of separation channels are shown in the previously discussed FIGS. 2-5 and 7.

The centrifuge is fixed to a shaft 17 which is rotatably mounted in two bearings 18 and 19, and which can be externally driven at 20. Seal 21 limits possible leakage between centrifuge 14 and housing 22.

In FIGS. 9 and 10, sectional views are presented of the inlet and outlet arrangement of the construction shown in FIG. 8. The inlet arrangements consists of a tangential volute 23, an impeller 24 with blades 25, fixed to shaft 17, and an exit 26 for removing separated particles. The outlet arrangement shown in FIG. 10 consists of a tangential volute 27, and a impeller 28 with blades 29 fixed to shaft 17.

The impellers in the inlet and outlet arrangements rotate as a rigid body with the centrifuge. The inlet impeller can serve as a means to bring the gas into the rotation of centrifuge 14, to divert the flow in axial direction and to divide to throughput over the various separation channels of centrifuge 14. The outlet impeller can form part of an energy reclaiming device in which rotation is transferred into translation via volute 27, the translation being transferred into pressure via diffuser 30.

Volute 23 can also serve as a means for transporting the particles which are collected in the separation channels of centrifuge 14. These particles can be removed according to previously described methods: for example, in case of solid particles, by stopping the rotation periodically and keeping the centrifuge upright. Release of particles which are coagulated to the collecting boundary of the separation channels can be enhanced by applying vibrator 31, and subsequently sucking released particles via exit 26, which is provided with valve 28.

The configuration shown in FIGS. 8-10 can also be employed to dry or demist gases. Due to expansion of the gas when being led through volute 23 and impeller 24 of the inlet arrangement shown in FIG. 9, the temperature drops and condensate droplets may form. Due to centrifugation, these droplets are stripped from the gas while passing through separation channels 15.

Figure 11:
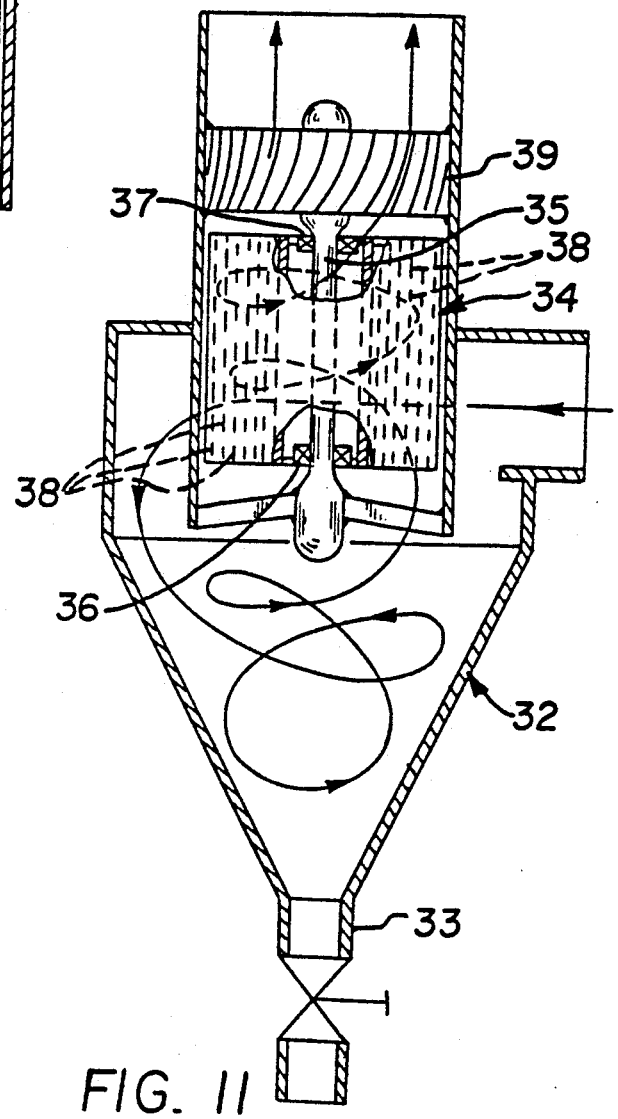
FIG. 11 is a sectional view of a variation of the separator shown in FIG. 8.

FIG. 11 is a sectional view of a variation of the separator shown in FIG. 8. A cyclone is installed upstream of the rotating particle separator according to the present invention. The swirl of the gas in the cyclone serves both as a means to centrifugate the larger particles to wall 32, which are subsequently removed via exit 33, and to provide the momentum to rotate centrifuge 34 of the rotating particle separator according to the present invention. The centrifuge is rotatably mounted to shaft 35 via bearings 36 and 37. Particles which are collected within separation channels 38 of the rotating particle separator can be removed adopting previously explained methods and can be transported via exit 33. The tangential momentum of the gas leaving the rotating particle separator can be converted into pressure using stator blades 39.

The rotating particle separators shown in FIGS. 8-11 can be applied to remove particulate matter from combustion gases produced in the burning of coal. In case of a coalfired power plant with a thermal power of 100 megawatt, about 1 000 kilograms per hour of fly-ash have to be collected from approximately 30 cubic meters per second of combustion gases. Approximately 10% of the fly-ash involves particles with cross-sectional dimensions of 10 micron or less. Using two separation units according to FIGS. 8-10 whereby each unit handles half of the amount of combustion gases produced and where each unit rotates with an angular velocity of 50 radians per second and has a peripheral radius of 1 meter, particles of cross-sectional dimensions of 10 micrometers and larger can be stripped in an inlet arrangement with an axial length of about 1.5 meter. In case of separation channels 15 which consist of circular or square pipes of internal diameter or width of 3 millimeters, respectively, and of axial length of 2 meters, almost all particles with a diameter of 1 micrometer and larger, and approximately half of the particles with a diameter between 1 and 0.5 micrometer will be collected within the separation channels. Each rotatable particle separator comprises about 200,000 separation channels which could, for example, be fabricated by enrolling profiled plate around a shaft. About every 6 hours the rotation of the separator has to be stopped in order to remove collected particles. During this period, a third standby rotating separator can be employed. The volume required by the three separators is not more than 3 percent of that of conventionally applied fly-ash collecting systems such as electrostatic precipitators or baghouse filters in combination with cyclones. The power loss over the rotating separators is approximately 30 kilowatts, which is only 0.03 percent of the thermal power of the plant considered.

The size of the rotating particle separator is directly related to the amount of gases to be treated and is small in comparison with conventional particle collecting systems. For a coal fired combustion unit of 1 megawatt thermal power, two particle separators can be used, one rotating and one standby, each separator having a peripheral radius of approximately 0.15 meter and a length of approximately 0.5 meter. The peripheral velocity is 50 meters per second in which case a collection efficiency of particles similar to that quoted for the 100 megawatts plant is achieved. The power loss remains low, of a value of around 0.03 percent of the thermal power generated.

The degree by which small sized particles can be collected using the rotating particle separator can be improved by increasing angular velocity, reducing the radial width of the separation channels, increasing their length, and reducing the throughput per channel. For example, doubling the angular velocity and length of the previously discussed rotating particle separator, and halving the radial width of the separation channels and the throughput per unit area, it is possible to separate almost all particles with a diameter of 0.2 micrometer and larger and almost 50% of all particles with a diameter between 0.2 and 0.1 micrometer.

The rotating particle separator according to the present invention provides an attractive means to separate particulate matter with diameters in the range of 0.1 to 5 micrometers, from gases, the device being limited in size, involving low energy consumption and allowing high throughput. Application of the rotating particle separator according to the present invention is particularly attractive in those areas where conventional systems are limited, such as in case of removal of particulate matter from gases of high temperature or from corrosive gases, or particulate matter which is limited in electrostatic loadability.

Applications for the present invention are: removal of particulate matter from combustion gases of coal-fired power plants; high-temperature cleaning of gases from coal - gasification plants and pressure-rised fluid bed combustors; separation of dust particles from the intake air of turbines, compressors and engines; provision of clean-room conditions for hospitals, laboratories, living accomodations of people with respiratory affections, etc.; dust removal in industries such as cement-, aluminium- and asbestos production; collection of small particulate matter in chemical and pharmaceutical processes;

drying of gases by separating condensate droplets; separation of radio-active particles from contaminated gases; and removal of soot and other particulate matter from combustion gases of diesel-fired engines.

I claim:

1. A rotational particle separator for separating particulate material having cross-sectional dimensions from about 0.1 micron to about 5 microns from a gas, said separator comprising:

a housing having a gas inlet and a gas outlet a centrifuge rotatably mounted in said housing along a rotation axis extending through said housing, said centrifuge including at least ten radially-spaced individual separation channels which extend parallel to each other and parallel to said rotation axis, each of said separation channels having a cross-section along substantially the entire length thereof which extends azimuthally about said rotation axis by less than 360° to prevent azimuthal flows greater than 360° about said rotation axis in any of said individual separation channels and each of said separation channels having a cross-sectional width less than 8 mm; and means for rotating said centrifuge within said housing about said rotation axis.

2. A rotational particle separator for separating particulate material having cross-sectional dimensions from about 0.1 micron to about 5 microns from a gas, said separator comprising:

a housing having a gas inlet and a gas outlet;

a centrifuge rotatably mounted in said housing along a rotation axis extending through said housing, said centrifuge including at least ten radially-spaced individual separation channels which extend parallel to each other and parallel to said rotation axis, each of said separation channels extending azimuthally about said rotation axis by less than 360° to prevent azimuthal flows greater than 360° about said rotation axis in any of said individual separation channels, each of said separation channels having boundary walls along substantially the entire length thereof bounding the separation in radial and azimuthal directions relative to the rotation axis and each of said separation channels having a cross-sectional width less than 8 mm; and means for rotating said centrifuge within said housing about said rotation axis.

3. A rotational particle separator for separating particulate material having cross-sectional dimensions from about 0.1 micron to about 5 microns from a gas, said separator comprising:

a housing having a gas inlet and a gas outlet;

a centrifuge rotatably mounted in said housing along a rotation axis extending through said housing, said centrifuge including at least ten radially-spaced individual separation channels which extend parallel to each other and parallel to said rotation axis, each of said separation channels extending azimuthally about said rotation axis by less than 360° to prevent azimuthal flows greater than 360° about said rotation axis in any of said individual separation channels, each of said separation channels enclosed along substantially the entire length thereof by a single wall and each of said separation channels having a cross-sectional width less than 8 mm; and means for rotating said centrifuge within said housing about said rotation axis.

4. The rotational particle separator of claim 1, 2 or 3 further including rotary means installed upstream of the separation channels for controlling the division of gas flow over the separation channels and for preventing internal circulations in the centrifuge.

5. The rotational particle separator of claim 1, 2 or 3 further including rotary means installed downstream of the separation channels for controlling the division of gas over the separation channels and for preventing internal circulations in the centrifuge.

6. The rotational particle separator of claims 1, 2 or 3 wherein said separation channels have circular cross sections.

7. The rotational particle separator of claims 1, 2 or 3 wherein said separation channels have a generally rectangular cross section.

8. The rotational particle separator of claims 1, 2 or 3 wherein the downstream end of a separation channel extends axially beyond the downstream end of separation channels arranged at a larger radius of the rotational axis.

9. The rotational particle separator of claims 1, 2 or 3 further including a pre-separator installed upstream from the separation channels.

* * * * *

UNITED STATES PATENT AND TRADEMARK OFFICE
CERTIFICATE OF CORRECTION

PATENT NO. : 5,073,177
DATED : December 17, 1991
INVENTOR : Jozef J. H. Brouwers It is certified that error appears in the above-identified patent and that said Letters Patent is hereby corrected as shown below:

Column 1 Line 54 "U.S. Application No." should read --U.S. Pat. No.--.

Column 1 Line 68 "as a large as" should read --as large as a--.

Column 3 Line 56 before "hundred" insert --one--.

Column 7 Line 7 "a impeller" should read --an impeller--.

Column 7 Line 13 before "throughput" delete --to--.

Column 7 Line 57 "1 000" should read --1,000--.

Claim 1 Line 11 Column 9 after "outlet" insert --;--.

Claim 4 Line 24 Column 10 "claim" should read --claims--.

Claim 5 Line 29 Column 10 "claim" should read --claims--.

Signed and Sealed this

Twenty-fifth Day of May, 1993

Attest:

MICHAEL K. KIRK

Attesting Officer
Acting Commissioner of Patents and Trademarks